(12) United States Patent
Marotel et al.

(10) Patent No.: US 6,772,677 B2
(45) Date of Patent: Aug. 10, 2004

(54) ELECTRIC FRYER WITH A DEVICE FOR KEEPING FRIED FOOD HOT

(75) Inventors: Michel Marotel, Cheuge (FR); Jean-Marc Payen, Quetigny (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/734,154

(22) Filed: Dec. 15, 2003

(65) Prior Publication Data

US 2004/0123742 A1 Jul. 1, 2004

(30) Foreign Application Priority Data

Dec. 13, 2002 (FR) .......................................... 02 15831

(51) Int. Cl.[7] .............................................. A47J 37/12
(52) U.S. Cl. ........................... 99/330; 99/337; 99/339; 99/403; 99/483; 219/432; 219/438
(58) Field of Search .................. 99/326–333, 337–340, 99/483, 403–417; 219/438, 439, 430, 432, 429, 435, 214

(56) References Cited

U.S. PATENT DOCUMENTS

| | | | |
|---|---|---|---|
| 3,665,878 A | * | 5/1972 | Koschoff et al. ........... 112/295 |
| 4,889,972 A | | 12/1989 | Chang |
| 5,355,777 A | * | 10/1994 | Chen et al. .................... 99/340 |
| 5,400,700 A | * | 3/1995 | Bois ............................. 99/403 |
| 5,429,039 A | * | 7/1995 | Chang ......................... 99/331 |
| 5,584,234 A | * | 12/1996 | Baillieul et al. .............. 99/403 |
| 5,682,809 A | | 11/1997 | Harrison |
| 5,839,357 A | * | 11/1998 | Ha et al. ....................... 99/337 |
| 5,996,474 A | * | 12/1999 | Collas et al. ................. 99/337 |
| 5,996,477 A | | 12/1999 | Bois et al. |
| 6,173,643 B1 | * | 1/2001 | Qian et al. .................... 99/339 |
| 6,182,558 B1 | | 2/2001 | Marchione |
| 6,283,015 B1 | * | 9/2001 | Kwon et al. .................. 99/337 |
| 6,499,390 B1 | * | 12/2002 | Huang .......................... 99/331 |
| 6,545,252 B2 | * | 4/2003 | Wang ......................... 219/432 |
| 8,546,848 | * | 4/2003 | Ehlhardt et al. .............. 99/403 |
| 6,666,131 B2 | * | 12/2003 | Bizard ......................... 99/403 |

* cited by examiner

Primary Examiner—Timothy F. Simone
(74) Attorney, Agent, or Firm—Browdy and Neimark, P.L.L.C.

(57) ABSTRACT

A household electric fryer having: a case having a bottom and a side wall and enclosing a warming chamber, the side wall having a lateral opening permitting access to the warming chamber; a bowl contained in the case above the warming chamber, the bowl having a bottom; electric heating elements for heating the bowl to frying temperatures; and an element presenting an imperforate surface between the electric heating elements and the warming chamber.

20 Claims, 5 Drawing Sheets

ELECTRIC FRYER WITH A DEVICE FOR KEEPING FRIED FOOD HOT

BACKGROUND OF THE INVENTION

The present invention relates to the technical field of household electric fryers and concerns more particularly fryers of the type having a bowl mounted in an outer case.

The tastiness, and hence the enjoyment, of fried food decreases soon after the foods have been taken from the frying liquid, particularly because the associated decrease in temperature produces a more or less pronounced decrease in the crispness of the foods. This evolution occurs in particular in the case of french fries, which generally represent a large percentage of fried foods.

A multifunction electric cooking appliance is known, for example from U.S. Pat. No. 4,889,972, which has a case containing a bowl associated with electric heating means, the side wall of the case having a lateral opening permitting access to a chamber provided in the case below the bowl. Electric heating means are also provided for heating this chamber. However, the upper wall of the chamber is formed by a perforated sheet. This arrangement directly exposes the food contained in the chamber to radiation from the electric heating means. In addition, this arrangement complicates cleaning of the chamber.

BRIEF SUMMARY OF THE INVENTION

The present invention provides a new household electric fryer that permits the preparation of relatively large quantities of foods without affecting, in a significant manner, their eating qualities or enjoyability, and without requiring a large volume of frying liquid.

The present invention also provides an electric fryer of the type described above having an overall size that is comparable to that of conventional household fryers.

In addition, the present invention provides an electric fryer of the type described above that can be fabricated at low cost.

Finally, the present invention provides a fryer of the type described above that is easy to use.

More specifically, the present invention provides a household electric fryer having a case provided with a bottom and a side wall, the case containing a bowl associated with electric heating means, the side wall of the case having a lateral opening permitting access to a warming chamber disposed in the case below the bowl. The electric heating means and/or additional electric heating means are provided to heat the warming chamber. A protective sheet, or a reflector, or the bottom of the bowl provides an imperforate surface arranged between the electric heating means and the warming chamber. In effect, the presence of a protective sheet, a reflector, or the bottom of the bowl between the electric heating means and the warming chamber permits the temperature reached in the warming chamber to be limited, with a more uniform diffusion of the heat.

A direct exposure to radiation from the electric heating means used for heating the frying oil would produce temperatures that are locally too high in the warming chamber, which would contribute to degrading the quality of the fried food placed in this chamber.

The arrangements according to the present invention permit foods produced in two successive frying operations to be served in good condition simultaneously. These arrangements permit the serving of two different types of foods, for example french fries and breaded meats, or even to serve a larger quantity of the same food, without having to use a larger quantity of cooking liquid. Foods held in the warming chamber retain a better eating quality. In addition, when two different foods must be fried for different times, these arrangements facilitate organization of the cooking. In addition, these arrangements facilitate cleaning of the warming chamber.

According to one form of construction according to the invention, the protective sheet forms at least a part of an upper wall of the warming chamber. The electric heating means can be in permanent contact with the protective sheet for fryers having a fixed or removable bowl in which the heating elements are mounted in the case. However, the electric heating element can also be fixed to a bowl removably mounted in the case.

The protective sheet permits a better distribution of heat in the warming chamber and avoids overheating of foods disposed close to the heating means. The protective sheet also facilitates cleaning of the interior of the warming chamber, and prevents the user from contacting the heating means.

Then, according to a preferred form of construction, the protective sheet is in thermal contact with the electric heating means. This arrangement is well adapted to fryers having a bowl that is fixed in the case, or even fryers having a bowl that is removable and that has a heating element fixed to its bottom. Alternatively, the protective sheet can be arranged at a distance from the electric heating means.

Also advantageously, the protective sheet forms at least one part of a side wall of the warming chamber. This arrangement permits the provision of a compartment particularly for receiving electric components of the fryer.

According to another form of construction, a reflector is mounted in a counter-bowl in which the bowl itself is housed. This arrangement is well adapted for fryers having a bowl that is removably mounted in the case, the heating elements being fixed to the case.

According to yet another form of construction, the electric heating means are arranged at the interior of the bowl. These heating means then directly heat the cooking liquid.

According to still another form of construction, the electric heating means are capable of heating the bottom of the bowl, and the warming chamber is disposed at least partially below the electric heating means. According to this form of construction, the electric heating means can be disposed in the bottom wall of the bowl. The electric heating means can alternatively be disposed against the bottom of the bowl, inside or outside the bowl. The electric heating means can also be disposed at the interior of the bowl in proximity to its bottom. In this case, the bowl will not present a cool zone under the heating element and the temperature of the bottom of the bowl is close to that of the frying liquid.

The electric heating means can also be disposed outside of the bowl in proximity to its bottom. Heating of the bowl will then be effectuated by radiation, or even by conduction if a thermal bridge connects the electric heating means to the bowl. In such appliances, a space is provided under the bottom of the bowl to avoid heating the bottom of the bowl to an unduly high temperature. Arrangements according to the invention permit utilization of the space present under the bottom of bowl and to use the heat furnished by the heating means to keep foods that have been fried in a first frying operation warm during frying of a subsequent quantity of food. If necessary, additional electric heating means can complete the heating of the warming chamber.

According to another form of construction, additional electric heating means are provided to effect at least the major part of the heating in the warming chamber. According to this form of construction, the electric heating means are for example arranged in the bowl in a manner to form a cooler zone in the frying liquid. This latter arrangement contributing to increasing the total volume of the frying liquid, the arrangements according to the invention permit one to envision a reduction in the useful volume of the frying liquid while permitting the production of large quantities of appetizing fried foods.

Advantageously, the warming chamber communicates through at least one passage with the region outside the case, in order to allow the escape of moisture coming from the fried foods held in the warming chamber. This arrangement permits changes in the eating quality of the food to be avoided. In effect, maintaining fried foods warm or hot in a closed enclosure causes them to become soft, or soggy, and results in a less agreeable flavor. Preferably, the passage provided according to the present invention opens into the upper part of the warming chamber.

Advantageously, the lateral opening is blocked at least partially by a door, thereby permitting heat losses to be limited.

Also advantageously, the passage is arranged between the door and the side wall of the case, this arrangement being simple to produce. Other arrangements can be envisioned, for example, a steam evacuation orifice arranged in a wall of the case and connected to the warming chamber.

According to one advantageous form of construction, the door forms an outer lateral wall of a drawer capable of being disposed in the warming chamber. This arrangement helps to facilitate keeping the food hot in the warming chamber and then withdrawing the food when desired. The drawer is preferably removably mounted with respect to-the case and can in particular be slidably mounted in the warming chamber or can even be pivotably mounted with respect to the case.

Advantageously then, the drawer has a bottom provided with raised parts that aid draining of foods maintained in the drawer.

According to an advantageous form of construction, electric control and/or safety components are disposed in a compartment arranged in the case under the bowl, laterally with respect to the warming chamber. This arrangement permits the lateral size of the fryer to be reduced.

Also advantageously, in order to permit a better regulation of the temperature of the frying liquid disposed in the bowl, a cool zone is provided under the bowl above the above-mentioned compartment, the electric control and/or safety devices being arranged in the cool zone.

Advantageously, the lateral opening is arranged in a lower part of the case, the bottom of the case belonging to said lower part. This arrangement permits assembly of the fryer to be simplified.

Also advantageously, the additional electric heating means comprise a heating element disposed in the lower part of the warming chamber. This arrangement permits a more homogeneous distribution of heat, in particular in the case of fryers having electric heating means arranged to heat the bottom of the bowl. The heating element can serve as a support for the drawer or for a dish disposed in the warming chamber.

In addition, advantageously, the additional electric heating means comprise a heating element disposed in the upper part of the warming chamber. This arrangement is particularly favorable when the additional heating means are mainly responsible for heating the warming chamber.

DETAILED DESCRIPTION OF THE INVENTION

Figure 1:
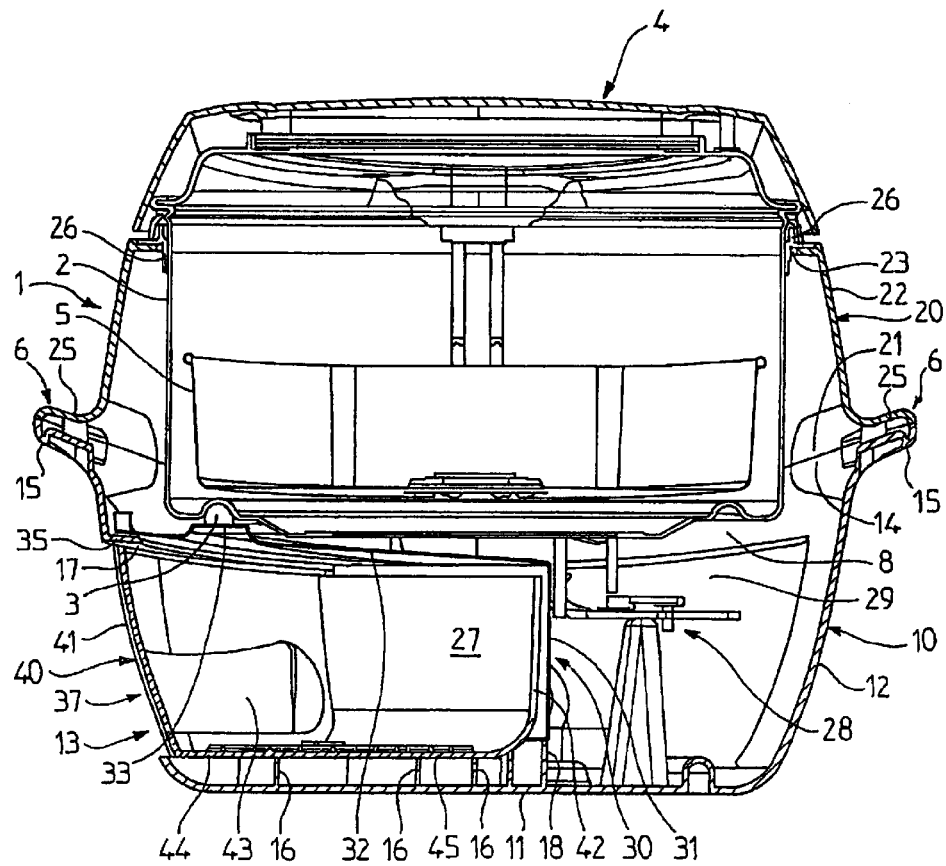
FIG. 1 is a cross-sectional view of a first embodiment of a fryer according to the invention.
Figure 2:
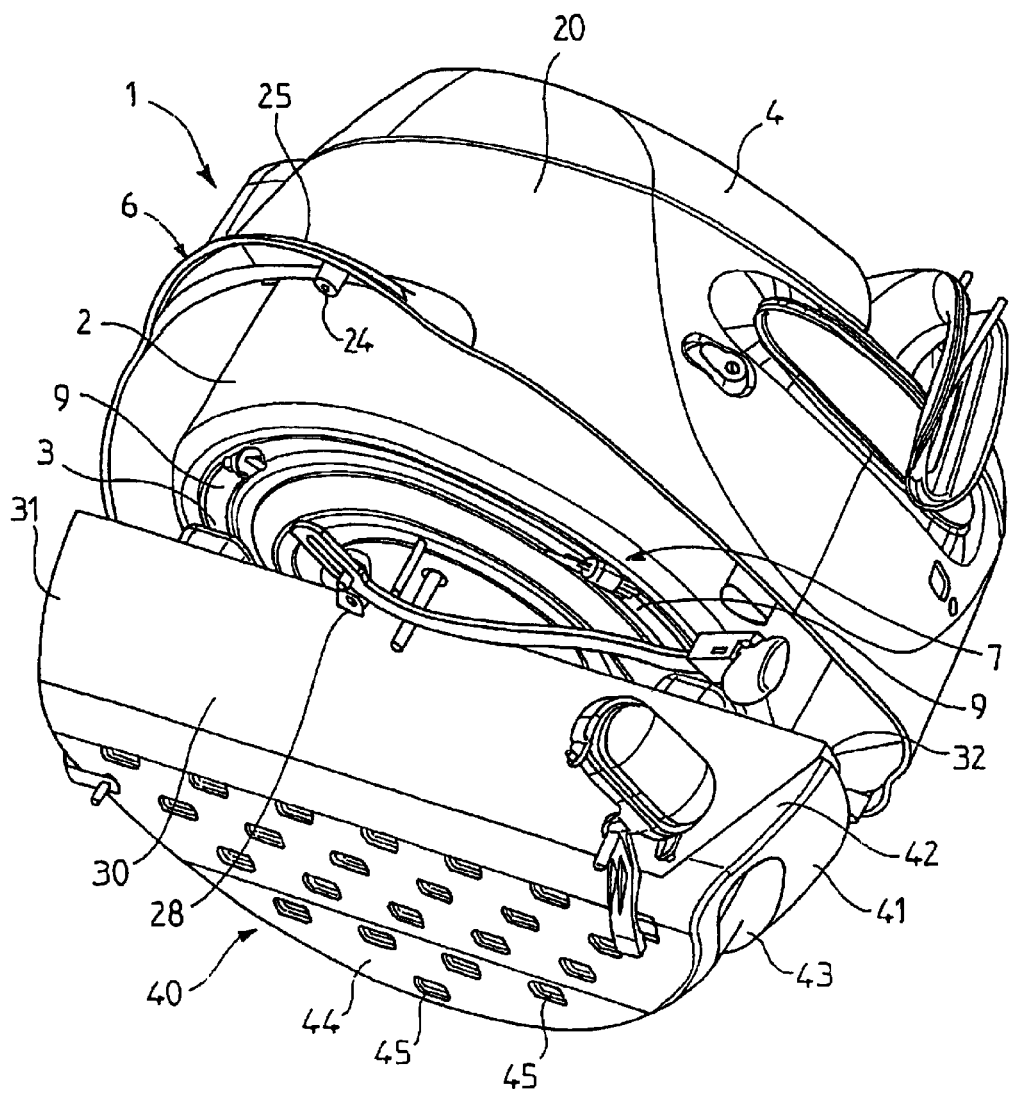
FIG. 2 is a perspective view, from the bottom, of the embodiment of FIG. 1, in which the lower part of the outer case has been removed to allow illustration of interior components.
Figure 3:
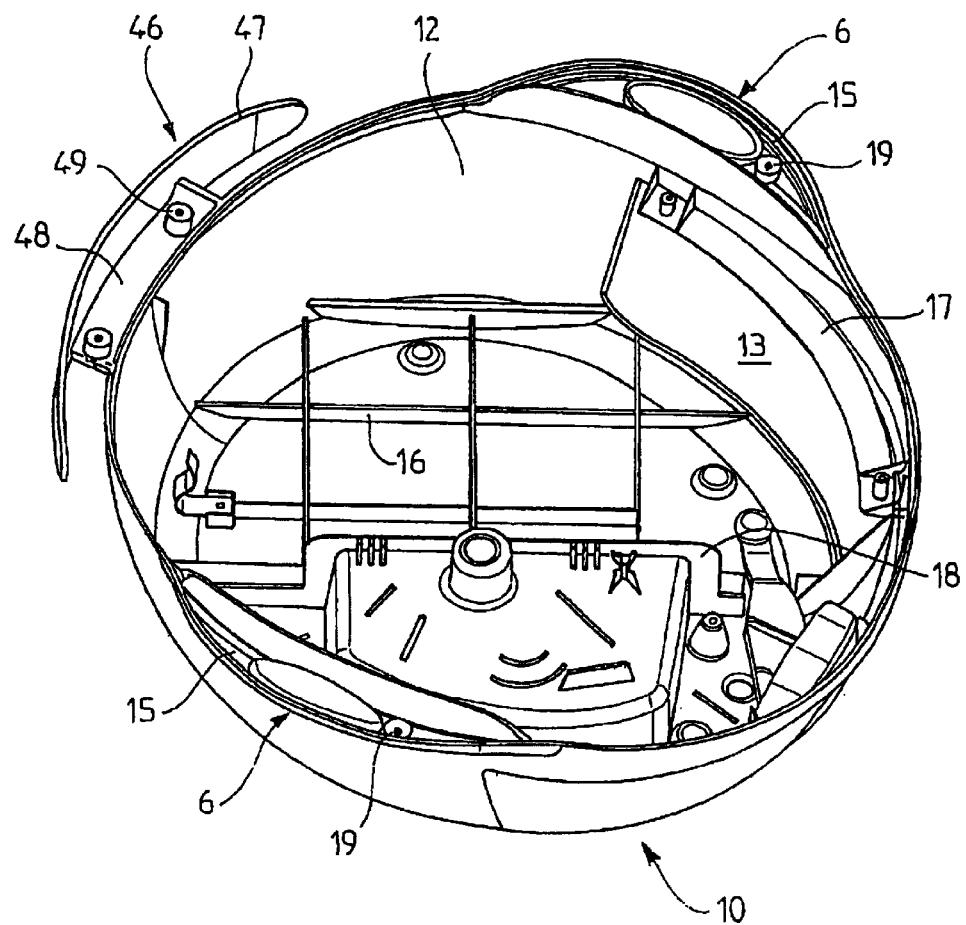
FIG. 3 is a perspective view from the top of the lower part of the case of the embodiment shown in FIG. 1.

A first embodiment of the invention is shown in FIGS. 1 to 3. FIG. 1 shows a fryer having an outer case 1 in which is housed a bowl 2 provided to contain a frying liquid. Bowl 2 is fixed in case 1 and is associated with electric heating means 3. Case 1 is closed by lid 4. Bowl 2 can receive a basket 5 intended to contain food to be fried.

Case 1, as shown in FIGS. 1 and 2, has a lower part 10 forming a pedestal, as well as an upper part 20 forming a skirt, arranged at a distance from bowl 2. Lower part 10 of case 1 has a bottom 11 and a side wall 12 defining an upper opening 14. In FIG. 2, a lower part 10 of case 1 has been removed. Upper part 20 of case 1 has a side wall 22 defining a lower opening 21 and an upper opening 23. Lower part 10 and upper part 20 of case 1 are made, for example, of polypropylene. A ring 26 rests on upper part 20 of case 1, and the upper edge of bowl 2 rests on ring 26. Ring 26 is made of a plastic material able to withstand the high temperatures reached by the upper edge of bowl 2 during frying, one such material being, for example, polybutylene terephthalate (PBTP).

Case 1 has two gripping elements, or handles, 6 disposed diametrically opposite one another. Handles 6 protrude from side walls 12, 22 of case 1. Handles 6 have a lower face 15 forming part of lower part 10 of case 1 and an upper face 25 forming part of upper part 20 of case 1. As shown in FIG. 3, each lower face 15 has a passage 19 provided to receive a fixation screw (not shown) that will engage in a bore 24 provided in the corresponding upper face 25, as shown in FIG. 2.

As shown in FIG. 3, lower part 10 of case 1 is provided with an outwardly projecting part 46 around which the power cord (not shown) of the appliance can be wound when the fryer is not in use. Part 46 has a wall 47 connected by a support 48 to lower part 10 of case 1. Support 48 is provided with two passages 49 each provided to receive a fixation screw that will engage in a respective bore in a support (not shown) extending from upper part 20 of case 1.

FIG. 3 shows lower part 10 of case 1. Side wall 32 of case 1 has a lateral opening 13 that is arranged in lower part 10 and that permits access to a warming, or keep-hot, chamber 27 (FIG. 1) provided in case 1 below bowl 2. Electric heating means 3 are provided to heat chamber 27 in a manner such that food that has already been fried and has been placed in the chamber is kept hot. As shown in FIG. 1, warming chamber 27 is disposed at least partially below electric heating means 3.

A drawer 40, shown in FIGS. 1 and 2, is installed in warming chamber 27. Drawer 40 rests on support posts 16 extending from bottom 11 of case 1. Drawer 40 has an outer side wall 41 forming a door 37 provided to close, in a non-sealing manner, opening 13 of case 1. Door 37 has a gripping zone 43. Drawer 40 also has an inner side wall and a bottom 44. Bottom 44 has upwardly protruding parts 45, such as bosses, which aid draining of fried foods placed in drawer 40.

Electric heating means 3 are capable of heating the bottom of bowl 2, essentially by conduction. A protective sheet 30, visible in FIGS. 1 and 2, is disposed under one part of bowl 2. Protective sheet 30 is in thermal contact with electric heating means 3 and provides a better distribution of heat in warming chamber 27. Protective sheet 30 forms at least one part of an upper wall 32 of warming chamber 27. For this purpose, protective sheet 30 extends to an upper inner edge 17 of case 1 disposed above lateral opening 13. As is clearly shown in FIG. 1, protective sheet 30 is arranged between electric heating means 3 and warming chamber 27. Protective sheet 30 also forms a part of a side wall 31 of warming chamber 27. To this end, protective sheet 30 extends down to a rib 18 extending upwardly from bottom 11 of case 1.

Behind side wall 31 there is provided a compartment 29 in which electric elements 28 for regulation and/or safety are disposed. As shown in FIG. 1, compartment 29 is arranged in case 1 under bowl 2 laterally with respect to warming chamber 27. Electric heating means 3 are formed by a sheathed heating element, best seen in FIG. 2. A cool zone 8 is provided under bowl 2 and above compartment 29. The heating parts of heating element 7 are disposed outside of cool zone 8. The cool ends 9 of heating element 7 are disposed in compartment 29.

Electric elements 28 for control and/or safety are arranged in cool zone 8, in order to limit the direct thermal influence of heating element 7 on elements 28.

The appliance according to the invention is used in the following manner. The user fries a first quantity of food and removes it from bowl 2 with the aid, for example, of basket 5. The user then pulls drawer 40 out of warming chamber 27, aided by gripping zone 43, and transfers the fried food into drawer 40. The user then pushes drawer back into warming chamber 27 and then is able to fry a second quantity of food. Door 37 provides, with opening 13, a passage 35 for the escape of steam and moisture from the fried food housed in drawer 40 to the region outside of case 1. This helps to avoid premature softening of the fried food. When the second quantity of fried food is ready, the user can serve the two quantities of fried food together without excessive degradation of its eating qualities.

Figure 4:
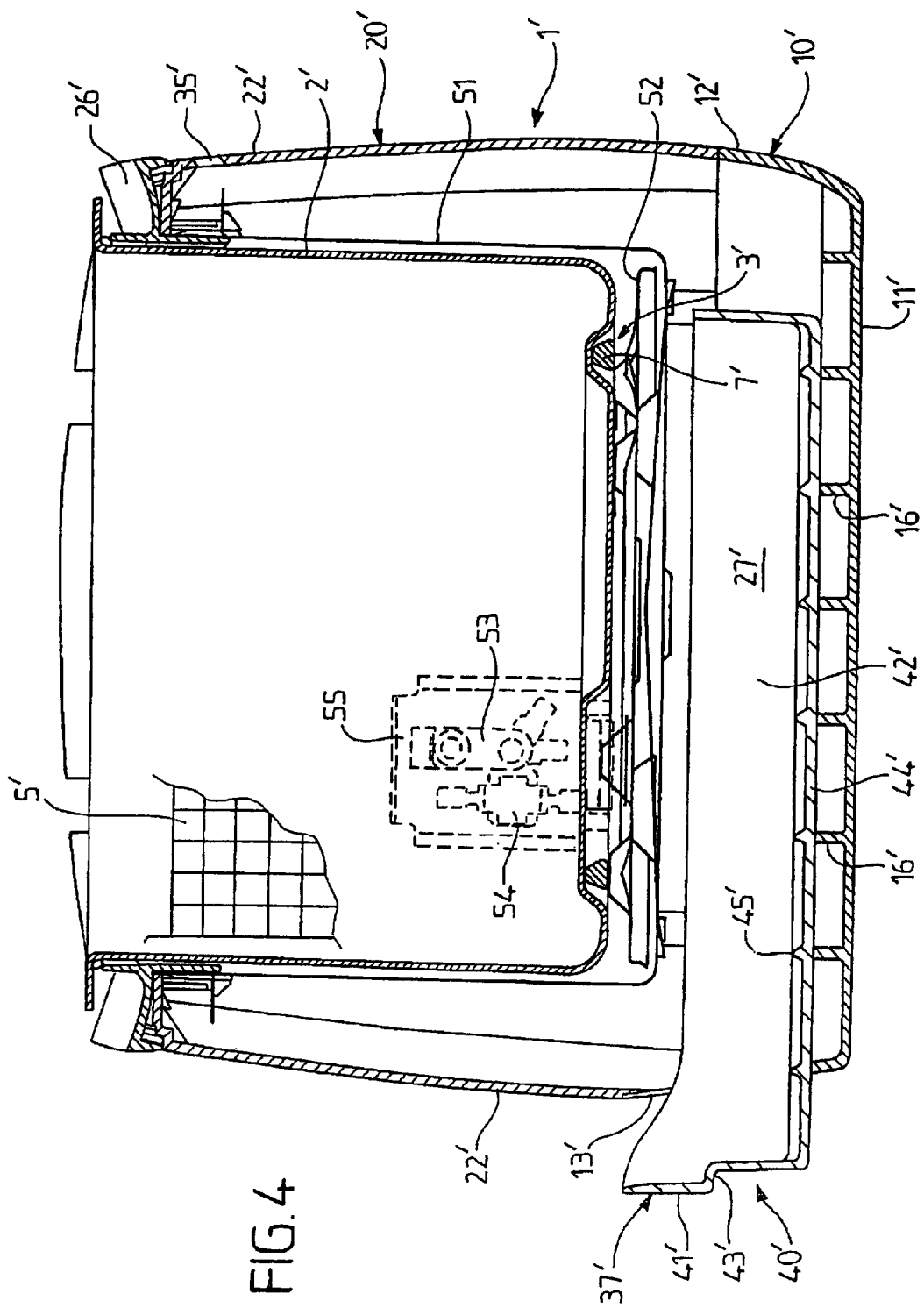
FIG. 4 is an elevational, cross-sectional view of a second embodiment of a fryer according to the invention.

The embodiment shown in FIG. 4 is to a fryer having a bowl 2' removably mounted in a case 1'. Bowl 2' can receive a basket 5' intended to contain food to be fried. A lid, not shown in FIG. 4, can close the upper part of case 1'. A counter-bowl 51 is installed in case 1'. A reflector 52 is disposed under the bottom of counter-bowl 51. Bowl 2' rests on electric heating means 3' mounted on reflector 52.

Heating means 3' are capable of heating the bottom of bowl 2' by conduction, as well as by radiation due to reflector 52. Electric heating means 3' are formed by a sheathed heating element 7'. A thermostat 53 and fuse 54 are arranged laterally with respect to bowl 2'. Thermostat 53 and fuse 54 are mounted on a plate 55 that is mounted in a floating manner with respect to counter-bowl 51.

Case 1' has a lower part 10' forming a pedestal, as well as an upper part 20' forming a skirt, arranged at a distance from bowl 2'. Lower part 10' of case 1' comprises a base 11' and a side wall 12'. Upper part 20' has a side wall 22'. Counter-bowl 51 is fixed to upper part 20' of case 1'. A ring 26' disposed on counter-bowl 51 protects upper part 20' of case 1'.

Reflector 52 permits heating of the bottom of counter-bowl 51 to be limited. In effect, because electric heating means 3' are not connected to bowl 2', a substantial part of the heating power from electric heating means 3' is dissipated by radiation, and not only by conduction. Because of the temperatures attained by the bottom of counter-bowl 51, bottom 11' of case 1' should be placed at a sufficient distance to avoid undue heating despite the presence of reflector 52. Thermostat 53 and fuse 54 being disposed laterally with respect to bowl 2', the space under counter-bowl 51 is not occupied. This space can be used to form a warming chamber 27'.

A lateral opening 13' formed in the side wall of case 1' permits access to warming chamber 27'. Lateral opening 13' is formed in part in side wall 12' of lower part 10' and in part in side wall 22' of upper part 20'. Warming chamber 27' is located in case 1' under counter-bowl 51. Warming chamber 27' is disposed below electric heating means 3'. As is shown in FIG. 4, reflector 52 is arranged between electric heating means 3' and warming chamber 27'.

Warming chamber 27' receives a drawer 40', represented in a slightly open position in FIG. 4. Drawer 40' rests on support uprights 16' that extend upwardly from bottom 11'. Drawer 40' has an outer front wall 41' forming a door 37' having a gripping zone 43'. Drawer 40' also has an inner side wall 42' and a bottom 44'. Bottom 44' has raised parts 45', such as ribs, which aid draining of oil from fried foods disposed in drawer 40'.

Warming chamber 27' communicates with the outside through a passage 35' that is disposed above warming chamber 27', close to the upper part of bowl 2'. Passage 35' is formed by a steam evacuation orifice provided in side wall 22' on a face opposite to the face having opening 13'.

The operation of this embodiment is comparable to that of the first embodiment.

Figure 5:
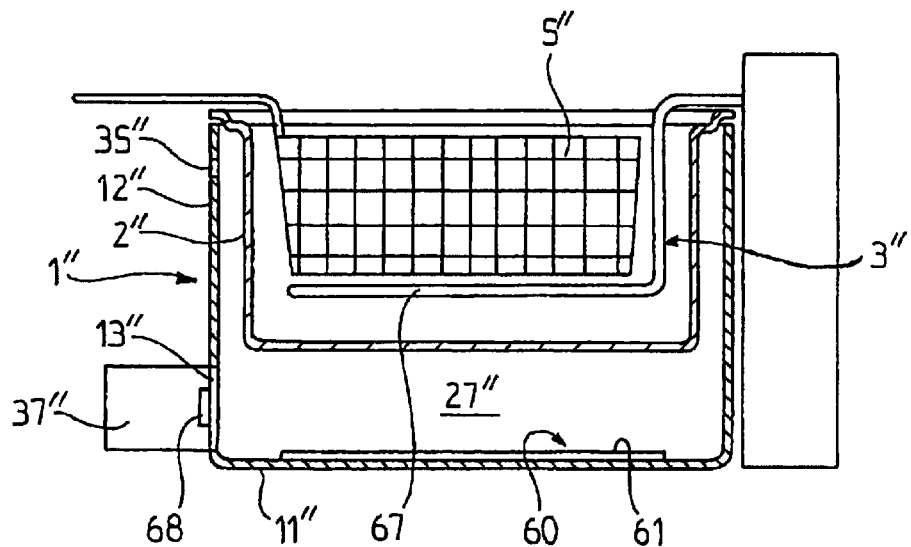
FIGS. 5 and 6 are simplified, elevational, cross-sectional views of two further embodiments of a fryer according to the invention.
Figure 6:
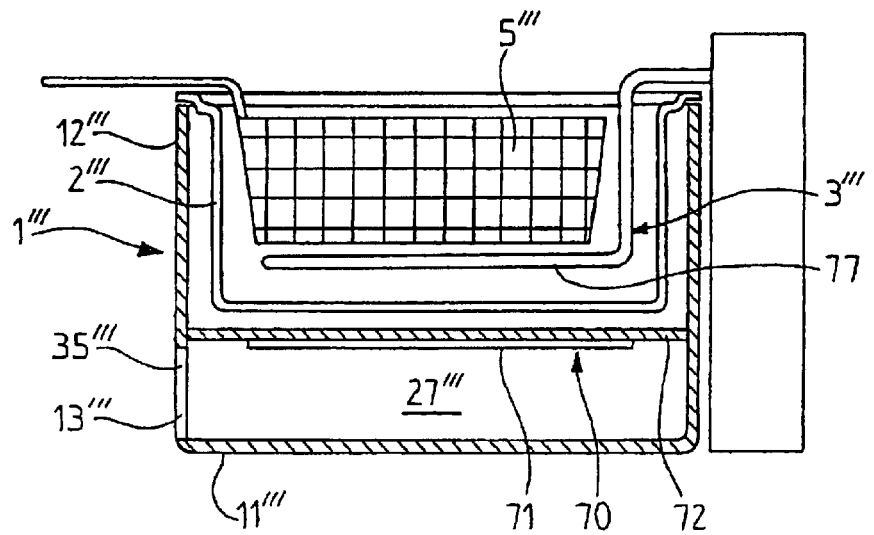

Two other embodiments are shown in FIGS. 5 and 6, respectively. In these embodiments, additional electric heating means are provided to assure the greater part of the heating of the warming chamber.

FIG. 5 shows a fryer having an outer case 1' receiving a bowl 2". Electric heating means 3" are formed by a heating element 67 that projects downwardly into bowl 2" at a distance above the bottom of the bowl, in a manner to create a cool zone below heating means 3". A frying basket 5" is placed in bowl 2" above heating means 3". Case 1" has a bottom 11" and a side wall 12". A lateral opening 13" is formed in side wall 12" below bowl 2". A door 37" mounted on a hinge 68 secured to case 1" is provided for closing the lateral opening 13". Lateral opening 13" permits access to a warming chamber 27" formed in case 1" under bowl 2". Warming chamber 27" communicates with the outside through a passage 35" disposed above warming chamber 27", close to the upper part of bowl 2". Passage 35" is formed by a steam evacuation orifice provided in side wall 12" of case 1".

Additional electrical heating means 60 are provided in case 1" and comprise a heating element 61 disposed in the lower part of warming chamber 27". Additional electric heating means 60 are provided to assure the necessary heating of warming chamber 27". As can be seen in FIG. 5, the bottom of bowl 2" is arranged between electric heating means 3" and warming chamber 27".

After having fried a first quantity of food, the user places this food in a dish (not shown), places the dish in warming chamber 27" and closes door 37". Passage 35" permits escape of steam and other vapor leaving the fried food disposed in warming chamber 27". The user can then fry a second quantity of food while keeping the first quantity of fried food hot in chamber 27".

FIG. 6 shows a fryer having an outer case 1''' receiving a bowl 2'''. Electric heating means 3''' are formed by a heating element 77 that projects downwardly into bowl 2''' at a distance from the bottom of the bowl, in a manner to provide a cool zone above the bottom of the bowl. A frying basket 5''' is place in bowl 2''' above electric heating elements 3'''. Case 1''' has a bottom 11''' and a side wall 12'''. A lateral opening 13''' is provided in side wall 12''' below bowl 2'''. Lateral opening 13''' permits access to a warming chamber 27''' provided in case 1''' beneath bowl 2'''.

Additional electric heating means 70 are provided in casing 1''', and comprise a heating element 71 disposed in the upper part of chamber 27'''. Additional heating means 70 are mounted under an internal partition 72 of case 1'''. Partition 72 is arranged under bowl 2'''. Additional heating means 70 are provided to assure the necessary heating of chamber 27'''. As is visible in FIG. 6, the bottom of bowl 2''' is arranged between electric heating means 3''' and chamber 27'''.

After having fried a first quantity of food, the user places this food in a dish (not shown), and places the dish in chamber 27'''. Steam and other vapors coming from the fried foods in chamber 27''' can escape through opening 13'''. Thus, opening 13''' forms a passage 35''' that places chamber 27''' in communication with the environment outside of case 1'''. The user can then fry a second quantity of food while keeping the first quantity hot in chamber 27'''.

According to a variation of the first embodiment, electric heating means 3 are not necessarily disposed beneath bowl 2 and/or are not necessarily in thermal contact with protective sheet 30. These electric heating means can in particular be disposed within the bowl, or even can be disposed in the wall of a molded, or cast, bowl. Protective sheet 30 can be made of several parts and/or can be disposed at a distance from the electric heating means.

According to variations of the second embodiment, electric heating means 3' are not necessarily fixed to case 1', but can be mounted under bowl 2' or even in the wall of a molded, or cast, bowl.

As a variation of first and/or second embodiments, additional electric heating means can be added if desired to obtain better heating in the warming chamber.

According to variation that can be used for any of the embodiments, the various additional electric heating means can be combined to obtain better heating within the warming chamber.

This application relates to subject matter disclosed in French Application Number 0215831, filed Dec. 13, 2002, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to. . . " and "means for. . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A household electric fryer comprising:
   a case having a bottom and a side wall, said case enclosing a warming chamber and said side wall having a lateral opening permitting access to said warming chamber;
   a bowl contained in said case above said warming chamber, said bowl having a bottom;
   electric heating means for heating said bowl to frying temperatures; and
   means providing an imperforate surface between said electric heating means and said warming chamber.

2. The household electric fryer of claim 1, wherein said means providing an imperforate surface comprise a protective sheet that forms at least a part of an upper wall of said warming chamber.

3. The household electric fryer of claim 2, wherein said protective sheet is in thermal contact with said electric heating means.

4. The household electric fryer of claim 3, wherein said protective sheet forms at least one part of a side wall of said warming chamber.

5. The household electric fryer of claim 1, wherein said means providing an imperforate surface comprise a reflector mounted in a counter-bowl in which said bowl is housed.

6. The household electric fryer of claim 1, wherein said electric heating means are arranged at the interior of said bowl.

7. The household electric fryer of claim 1, wherein said electric heating means are disposed for heating the bottom of said bowl, and said warming chamber is disposed at least partially below said electric heating means.

8. The household electric fryer of claim 1, further comprising additional electric heating means disposed for supplying at least a major part of the heat for said warming chamber.

9. The household electric fryer of claim 1, further comprising a door arranged to at least partially block said lateral opening.

10. The household electric fryer of claim 9, further comprising a drawer adapted to be disposed in said warming chamber, and wherein said door forms an outer lateral wall of said drawer.

11. The household electric fryer of claim 10, wherein said drawer has a bottom provided with raised parts.

12. The household electric fryer of claim 1, wherein said appliance is provided with at least one passage that places said warming chamber in communication with a region outside said case.

13. The household electric fryer of claim 12, further comprising a door arranged to partially block said lateral opening, and wherein said passage is located between said door and said side wall of said case.

14. The household electric fryer of claim 13, further comprising a drawer adapted to be disposed in said warming chamber, and wherein said door forms an outer lateral wall of said drawer.

15. The household electric fryer of claim 14, wherein said drawer has a bottom provided with raised parts.

16. The household electric fryer of claim 1, wherein said case contains a compartment located under said bowl and laterally offset from said warming chamber, and said fryer further comprises electric control and/or safety components disposed in said compartment.

17. The household electric fryer of claim 16, wherein a cool zone is provided under said bowl and above said compartment, and wherein said electric control and/or safety devices are disposed in the cool zone.

18. The household electric fryer of claim 1, wherein said case has a lower part that includes said bottom, and said lateral opening is arranged in said lower part of said case.

19. The household electric fryer of claim 1, further comprising additional electric heating means comprising a heating element disposed in a lower part of said warming chamber.

20. The household electric fryer of claim 1, further comprising additional electric heating means comprising a heating element disposed in an upper part of said warming chamber.

* * * * *